July 23, 1940.    W. H. WALLIS    2,209,010

VARIABLE-SPEED GEARING

Filed March 23, 1939

Inventor
William Henry Wallis
By E. Stevens
ATTY.

Patented July 23, 1940

2,209,010

UNITED STATES PATENT OFFICE 2,209,010

VARIABLE-SPEED GEARING

William Henry Wallis, Huddersfield, England

Application March 23, 1939, Serial No. 263,754
In Great Britain March 30, 1938

2 Claims. (Cl. 74—331)

My invention relates to variable-speed gearing, particularly for automobiles, of the kind having co-axial driving and driven shafts.

An object of the invention is to provide a very compact, rigid and silent-running arrangement whereby five or more forward speeds and one or more reverse speeds can be obtained without the use of any auxiliary gear box.

A further object is to provide a construction or arrangement which does not necessitate the employment of shaft-supporting bearings other than end-wall bearings.

I have shown in the accompanying drawing a variable-speed gear according to the invention constructed to afford five forward speeds and a reverse drive.

Figure 1:
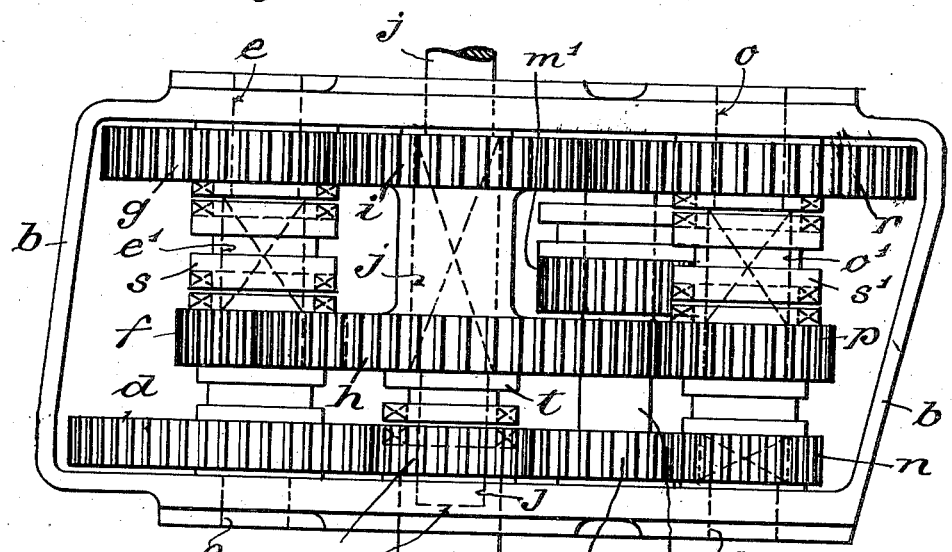
Fig. 1 shows the gear in plan.
Figures 2, 3:
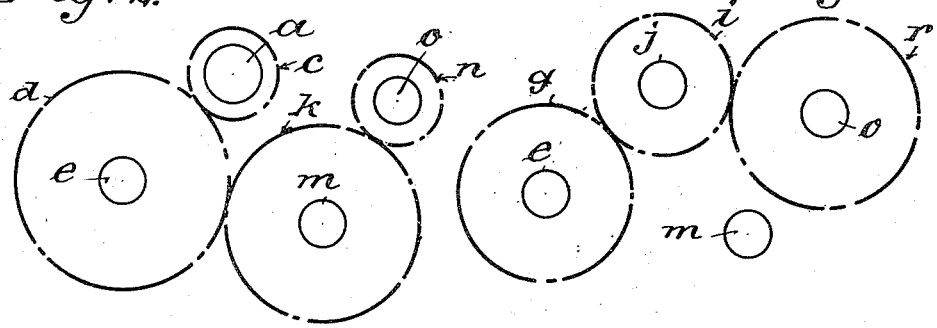
Fig. 2 is a diagram showing the primary gear train employed in the gearing.
Fig. 3 is a diagram showing the third and fifth speed gear train.

Referring to the drawing, $a$ is a driving shaft journalled in the wall of a casing $b$ and having fast upon it a toothed primary drive pinion $c$ which is constantly in mesh with a toothed primary drive gear $d$ fast upon a layshaft $e$ hereinafter referred to as the slow-speed layshaft. The shaft $e$ is journalled at its ends in the casing $b$ and extends parallel to the axis of the driving shaft $a$.

Loose upon the slow speed layshaft $e$ are a toothed pinion $f$ and a toothed gear $g$ which are in constant mesh respectively with a toothed gear $h$ and a toothed pinion $i$ fast upon a secondary or driven shaft $j$ co-axial with the driving shaft $a$. The driven shaft is journalled at its inner end in a recess $a'$ in the end of the driving shaft $a$ and at its outer end in the casing $b$.

Meshing constantly with the primary drive gear $d$ is an intermediate toothed gear $k$ which is fast upon a reverse shaft $m$ journalled at its ends in the casing $b$ and extending parallel to the driving shaft $a$ and slow-speed layshaft $e$. A pinion $m'$ slidable on splines on the shaft $m$ is adapted to be slid into engagement with the gear $h$ on the driven shaft $j$.

Meshing constantly with the intermediate toothed gear $k$ is a toothed primary drive pinion $n$ fast upon a layshaft $o$ hereinafter referred to as the fast-speed layshaft, the said shaft being journalled at its ends in the casing $b$ and extending parallel to the driving shaft $a$, slow-speed layshaft $e$ and reverse shaft $m$.

Loose upon the fast-speed layshaft $o$ are a toothed pinion $p$ and a toothed gear $r$ which are respectively in constant mesh with the toothed gear $h$ and the toothed pinion $i$ on the driven shaft $j$.

Slidable on a splined portion $e'$ of the slow-speed layshaft is a clutch member $s$ by means of which either the toothed pinion $f$ or the toothed gear $g$ can be clutched to the said slow-speed layshaft, and slidable on a splined portion $o'$ of the fast-speed layshaft $o$ is a clutch member $s'$ by means of which either the toothed pinion $p$ or the toothed gear $r$ can be clutched to the said fast-speed layshaft.

Slidable on a splined portion of the driven shaft $j$ is a clutch member $t$ by means of which the said shaft can be clutched to the primary drive pinion $c$.

The primary drive gears $d$ and $n$ are of different pitch diameters so that the layshafts $e$ and $o$ will revolve at relatively different speeds for all speeds of the primary shaft $a$, this ratio of layshaft speed being a predetermined factor. Different speed ratios are thus obtained from similar sized gear wheels on each layshaft.

To obtain fifth forward speed the gear $r$ is clutched to the fast-speed layshaft $o$ by means of the clutch member $s'$.

Fourth speed is obtained by a direct drive occasioned by sliding the clutch member $t$ into engagement with the primary drive pinion $c$.

Third speed is obtained by clutching the gear wheel $g$ to the slow-speed layshaft $e$. Providing the gears $r$ and $g$ are of the same pitch circle diameter, the ratio of the fifth speed to the third will be the same as that of the speed of the fast-speed layshaft to the speed of the slowspeed layshaft.

Second speed is obtained by clutching the pinion $p$ to the layshaft $o$ and first speed by clutching the pinion $f$ to the layshaft $e$.

Reverse drive is obtained by sliding the pinions $m'$ into engagement with the gear $h$ fast on the driven shaft $j$.

Figure 5:
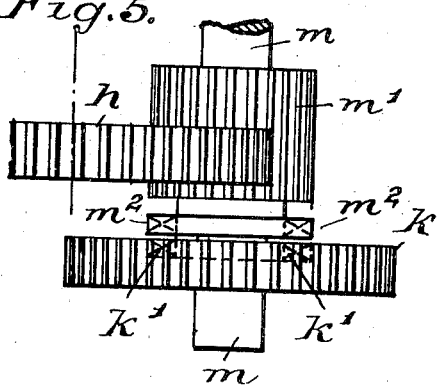
Fig. 5 is a detail showing a modification which may be adopted of the reverse drive arrangement shown in Fig. 1.
Figure 4:
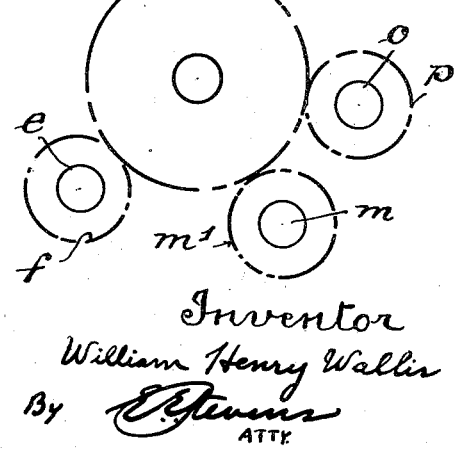
Fig. 4 is a diagram showing the first, second and reverse speed gear train.

As an alternative to the reverse drive arrangement shown in Fig. 1 the pinion $m'$ may, see Fig. 5, be loose upon the shaft $m_2$ and remain constantly in mesh with the gear $h$, clutch members $m$ on the said pinion being adapted to be moved into engagement with clutch members $k'$ on the gear $k$ when reverse drive is required.

It will be seen from Fig. 1 that the construction of each layshaft e or o is similar to that of an orthodox three-speed gear box, therefore the overall length of a five-speed gear box according to my invention is as short as that of a three-speed gear box of orthodox single-layshaft design and of equal load capacity.

The inclusion of syncro-mesh units for third, fourth and fifth speeds, if required, necessitates less additional length than would be the case in a single-layshaft gear box due to the fact that the third and fifth speed gear wheels are mounted on different layshafts.

Owing to the shortness of the layshafts rigidity and consequent silence, which are the main objects of the invention, are obtained, and relatively thin shafts are permissible. Further rigidity of the third and fifth speed gear wheels is obtained due to the said wheels being located adjacent the end wall bearings of their layshafts.

It will be observed that eleven toothed gears only are used in a five-speed gear box according to the invention. I do not confine myself to the use of either solid or tubular layshafts or to any particular method of mounting or fastening the gear wheels, shafts, bearings and the like used in constructing my improved variable-speed gear.

Having thus described my invention, what I claim as new and desire to secure by Letters Patent is:

1. In a variable-speed gear, a primary driving shaft, a second driven shaft co-axial with the primary shaft, two layshafts and a reverse shaft connected to the primary shaft by a single train of primary driving gears, in such manner that the said layshafts revolve unidirectionally at relatively different speeds to each other, a series of toothed gear wheels mounted loosely on the respective layshafts and means for transmitting motion through any one of said toothed gears or from the reverse shaft to the secondary shaft.

2. Variable speed gearing comprising in combination a driving shaft having fast thereon a toothed pinion, a driven shaft co-axial with said driving shaft and having fast thereon a toothed pinion and a toothed gear, a splined portion on said driven shaft, a clutch member slidable on said splined portion and adapted to clutch the said shaft to the driving shaft, a slow speed layshaft parallel to the driving and driven shafts, a toothed gear fast on said slow-speed layshaft and meshing with the pinion on the driving shaft, a toothed pinion loose on said slow-speed layshaft meshing with the toothed gear fast on the driven shaft, a toothed gear loose on the slow-speed layshaft meshing with the toothed pinion fast on the driven shaft, a splined portion on the slow speed layshaft, a clutch member slidable on said splined portion and adapted to clutch to said layshaft either the pinion or the gear loose thereon, a reverse shaft parallel to the driving and driven shafts, a toothed gear fast on said reverse shaft and meshing with the toothed gear fast on the slow-speed layshaft, a splined portion on said reverse shaft, a toothed pinion slidable on said splined portion and adapted to be slid into mesh with the gear fast on the driven shaft, a fast-speed layshaft parallel to the driving and driven shafts, a toothed pinion fast on said fast-speed layshaft and meshing with the gear fast on the reverse shaft, a toothed pinion loose on said fast-speed layshaft and meshing with the gear fast on the driven shaft, a toothed gear loose on the fast-speed layshaft and meshing with the pinion fast on the driven shaft, a splined portion on the fast-speed layshaft, and a clutch member slidable on said splined portion and adapted to clutch to the fast-speed layshaft either the pinion or the gear loose on said shaft.

WILLIAM H. WALLIS.